June 11, 1963 TAISHO IKETANI 3,093,166
CHARGING APPARATUS FOR LIQUEFIED GAS LIGHTERS
Filed Sept. 7, 1961
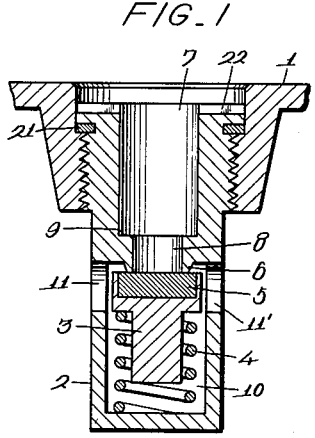
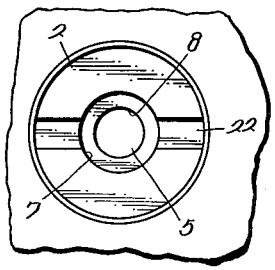
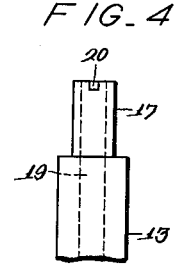
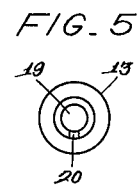
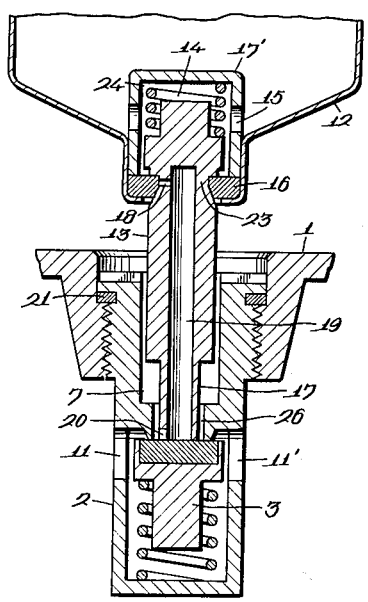
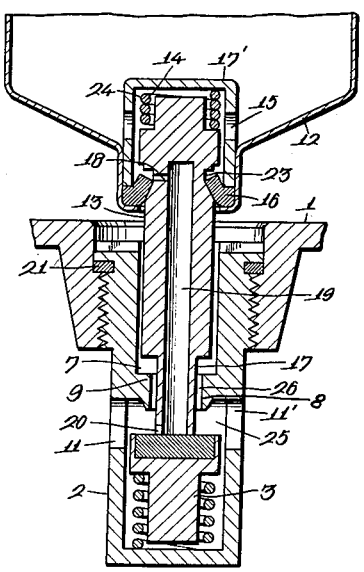
INVENTOR.
Taisho Iketani
BY Ernest G. Montague
Attorney 3,093,166
CHARGING APPARATUS FOR LIQUEFIED GAS LIGHTERS
Taisho Iketani, 589 Nogata-cho 1-chome, Nakano-ku, Tokyo, Japan
Filed Sept. 7, 1961, Ser. No. 136,639
Claims priority, application Japan July 22, 1961
2 Claims. (Cl. 141—295)

The present invention relates to an improvement of an injection mechanism for fuel gas in a liquefied gas lighter.

Injection valves for liquefied gas are known in which an injection passage for fuel liquified gas and a discharge passage for gas evaporated in a reservoir of the gas lighter are formed within their construction. Further, an injection mechanism is known, in which an injection valve having only an injection passage is connected to a supplementary value of a fuel bomb, and while a burner is opened so as to discharge air, and at the same time liquefied gas is injected, and after the reservoir is filled up with injected fuel, a part of the filled gas is discharged by delaying timely the closing of the injection valve after that of the supplementary valve.

In these known apparatus, means are provided for filling efficiently fuel liquefied gas of sufficient and safety quantity thereof, while discharging a part of evaporated gas in the reservoir.

It is one object of the present invention to provide an injection mechanism, wherein the defects, such as the complication of the valve and the inefficiency of operation can be entirely eliminated.

It is another object of the present invention to provide an injection mechanism, wherein upon the filling of fuel gas, an injection passage and a discharge passage of fuel gas between an injection valve and a discharge valve are formed by connecting a supplementary valve of a fuel bomb with the injection valve of a reservoir of the lighter.

With these and other objects in view, which will become apparent in the following detailed description, the present invention will be clearly understood in connection with the accompanying drawings, in which:

FIGURE 1 is an axial section of an injection valve for fuel gas in its closed position, the injection valve being secured to a reservoir of a lighter;

FIG. 2 is a top plan view thereof;

FIG. 3 is an axial section of an injection valve combined with a supplementary valve of a fuel bomb, and both valves being shown in closed position;

FIG. 4 is a fragmentary view of the essential part of a supplementary valve;

FIG. 5 is a top plan view of the part shown in FIG. 4; and

FIG. 6 is an axial section of an injection valve combined with a supplementary valve of a fuel bomb, and both valves being shown in operative position.

Referring now to the drawing, and in particular to FIGS. 1, 3 and 6, a reservoir of a gas lighter having a wall 1 is provided and a body 2 of an injection valve is screw threaded to the wall 1 of the reservoir including a resilient packing 21 at its upper part. The body 2 forms an inner shoulder 9 to divide it into two chambers 7 and 10. The chamber 7 communicates with its outer part with the open air. Both chambers 7 and 10 communicate with each other by means of an opening 8 formed at the center of the shoulder 9. The latter is formed with an inwardly projecting annular valve seat 6. A valve body 3 is disposed in the chamber 10, and a resilient packing 5, mounted at the outer end of the valve body 3, is pressed against the annular valve seat 6 outwardly together with the valve body 3 by means of a coil spring 4, which engages a shoulder of the valve body 3 at one end and the inner bottom face of the body 2 at the other end. The side walls of the body 2 are equipped with oppositely disposed openings 11 and 11'. The openings have predetermined positions and sizes, sufficient for exposing the valve seat 6 toward the reservoir of the lighter and thus upon performing the filling operation of liquefied gas, the impingement of the stream of liquefied gas against the inner wall of the chamber 10 is entirely avoided. Further, upon the filling operation, one of the openings serves as an injection opening for liquefied gas and the other one or a plurality of more openings serve as a discharge opening or openings.

Referring now to FIG. 3, the injection valve shown in FIG. 1 is disclosed in combination with the supplementary valve, just prior to the opening of the valves. A body 12 of the bomb or tank is provided and at the top end of the body 12 in a skirt member 17' and a valve stem 13 are supported by means of a resilient packing 16. The packing 16 engages a neck portion 23 of the valve stem 13 and is pressed downwardly by means of a coil spring 14 disposed between the valve stem 13 and the skirt member 17'.

FIG. 6 discloses the injection valve 3 in its open position, which has been opened by means of the valve stem 13 of the supplementary valve, which valve stem 13 is pressed downwardly together with the body 12 of the bomb. The valve stem 13 is inserted into the chamber 7 of the cylindrical body 2 from the outer end thereof and also the end portion 17 of the valve stem 13 is inserted through the bore 8 into the chamber 10. Thus, when the valve stem 13 is further pressed downwardly against the packing 5, the injection valve 3 is moved inwardly to be lifted from the valve seat 6 against the action of the coil spring 4. Accordingly, the injection valve 3 is entirely opened.

Liquefied gas contained in the bomb 12 passes now through the bore 15, provided in the side wall of the skirt member 17', the chamber 24 defined in the latter, the radial valve bore 18, the axial passage 19, the radial bore 20 at the lower end portion 17 of the valve stem 13, and a chamber 25 at the outer portion of the chamber 10, and then passes through the injection opening 11 into the reservoir of the gas lighter. Also, an annular chamber 26 formed between the lower end portion 17 of the valve stem 13 and the bore 8 in the shoulder 9 communicates with the open air and further with the reservoir through the discharge opening 11'. Accordingly, a part of the vapor evaporated from the liquefied gas injected into the reservoir of the gas lighter through the injection opening 11 is discharged through the discharge opening 11', the chamber 25, the annular chamber 26, and an annular chamber 26' between the valve stem 13 and the chamber 7 into the open air.

The lower end portion 17 of the valve stem 13 is inserted loosely into the bore 8, so as to provide the annular chamber 26, and consequently in accordance with the present invention, the injection mechanism is not provided with an actual discharge passage either in the injection valve and/or in the discharge valve, and instead thereof, an annular chamber 26' produced necessarily for operating the valve body externally serves as a discharge passage, which arrangement amounts to an essential feature of the present invention. As above described, discharge passages forming second passages are not required to be formed either in the injection valve and/or in the supplementary valve, and thus the manufacturing of the valves is made simple and easy.

In such injection mechanism, the height of liquid level injected into the reservoir of the gas lighter is not reached above the height of the valve seat, since the open sectional area of the annular chamber 26 forming the discharge passage is made at will larger than that of the injection passage 20.

Also, the side openings 11 and 11' may be provided at the level of the injection passage 20. However, even in either case, if liquefied gas from the valve stem is injected against the wall portion of the valve body 2, the injected liquefied gas, at the same time when the filling of liquefied gas starts, may be injected through the annular chamber 26 into the open air without prior evaporation, and consequently, not only would it be indistinguishable at the finishing of the injection operation of liquefied gas, but because of the reverse stream of the liquefied gas a correct injection of gas will be impeded thereby.

For this reason, the valve body 2 is formed with two horizontal openings 11 and 11' in the same direction as a groove 22, as shown in FIG. 2, which is formed for screw threading the valve body 2 to the reservoir of the gas lighter. Thus, in the case of inserting the supplementary valve into the injection valve, if the opening 20 in the valve stem 13 is put in the same direction as that of the groove 22, the stream of liquefied gas does not impinge against the inner wall of the valve body 2 and a correct injection of liquefied gas can be ensured.

As above described, the present invention resides in the feature of combining the injection valve secured to the reservoir and the supplementary valve secured to the fuel bomb or tank, when the filling of liquefied gas is effected in such manner, that a discharge passage is provided between both, the injection valve and the supplementary valve.

While I have disclosed one embodiment of the present invention, it is to be understood that this embodiment is given by example only and not in a limiting sense, the scope of the invention being determined by the objects and the claims.

I claim:

1. A charging apparatus for liquefied gas lighters, comprising in combination:
    a first fuel gas container,
    an injection valve and a supplementary filling valve, said injection valve comprising
    an outer cylindrical body member adapted to be secured to said first fuel gas container and having two oppositely disposed openings in the side wall thereof, as well as an innermost inner face,
    said outer cylindrical body member including an inwardly directed annular valve seat disposed outwardly of said openings,
    an inner valve body axially movable in said outer cylindrical body member and including an inwardly facing shoulder portion near its outer end,
    a first packing means received in and disposed on the outer face of said valve body and engaging said annular valve seat in the closed position of said injection valve,
    a first coil spring disposed between said innermost inner face of said outer cylindrical body member and said shoulder portion of said valve body and urging the latter into its outermost valve seat engaging position,
    said supplementary filling valve comprising a container body and a valve stem projecting from said container body and having a neck portion and an axial passage closed at its inner end and open at its outer end,
    a skirt member having an inner base face and receiving the inner end of said valve stem, said skirt member being retained in the outer end of said container body,
    a second packing means disposed at the outer end of said skirt member and received in said neck portion of said valve stem,
    a second coil spring disposed between said inner base face of said skirt member and a shoulder of said valve stem to urge the latter into its outermost position,
    the outer portion of said valve stem etxending into said outer cylindrical body member of said injection valve and the outer end of said valve stem engaging the outer face of said first packing means in its operative position with said injection valve,
    said valve stem having a first radial passage disposed at the inner end of said axial passage thereof and a second radial passage disposed at the outer end of said axial passage thereof, both said radial passages communicating with said axial passage,
    said second packing means sealing said first radial passage in the inoperative position of said valve stem,
    said first radial passage feeding fuel, upon pressing said valve stem against said inner valve body to move the latter inwardly against the pressure of said first coil spring, through said axial passage of said valve stem and said second radial passage into said injection valve in the operative position of the latter, wherein said valve stem is pushed into said container body against the pressure of said second coil spring, and through one of said openings of said outer cylindrical body of said first injection valve into said fuel gas container,
    the outer diameter of said valve stem being smaller than the inner diameter of said outer cylindrical body member to define an annular channel therebetween, and
    said annular channel communicating with another of said openings of said outer cylindrical body in the operative position of said valve stem, thereby permitting bleeding of said injection valve during the filling operation.

2. The charging apparatus, as set forth in claim 1, wherein
    said outer cylindrical body member has at its outer face a diametrically disposed groove,
    said groove being disposed in an axial plane extending through said openings of said outer cylindrical body member, to operate as indicator for said second axial passage of said valve stem, in order to align said second axial passage opposite one of said openings of said outer cylindrical body.

References Cited in the file of this patent

UNITED STATES PATENTS 2,769,325    Storch _____ Nov. 6, 1956

FOREIGN PATENTS 1,127,374    France _____ Aug. 6, 1956
1,191,271    France _____ Apr. 6, 1959
849,988    Great Britain _____ Sept. 28, 1960